United States Patent
Chuang et al.

(10) Patent No.: US 6,963,432 B2
(45) Date of Patent: Nov. 8, 2005

(54) FABRICATION OF TRUE APODIZED FIBER BRAGG GRATING USING A NEW TWO-BEAM INTERFEROMETER WITH POLARIZATION CONTROL

(75) Inventors: Kai-Ping Chuang, Pingtung (TW); Lih-Gen Sheu, Taoyuan (TW); Meng-Chang Tsai, Hsinchu (TW); Yinchieh Lai, Hsinchu (TW)

(73) Assignee: National Chiao Tung University, Hsinchu (TW)

(*) Notice: Subject to any disclaimer, the term of this patent is extended or adjusted under 35 U.S.C. 154(b) by 107 days.

(21) Appl. No.: 10/756,308

(22) Filed: Jan. 14, 2004

(65) Prior Publication Data

US 2005/0152646 A1    Jul. 14, 2005

(51) Int. Cl.⁷ .......................... G03H 1/04; C03C 25/00
(52) U.S. Cl. .................... 359/35; 359/352; 359/900; 65/392
(58) Field of Search .............. 385/37, 123; 359/34–35, 359/196, 352, 558–578, 900, 629–634; 65/386–392, 65/425; 430/290

(56) References Cited

U.S. PATENT DOCUMENTS

| 5,367,588 A | 11/1994 | Hill |
| 5,830,622 A | 11/1998 | Canning |
| 6,904,201 B1 * | 6/2005 | St. Hilaire et al. ........... 385/37 |
| 2002/0015919 A1 | 2/2002 | Lyngby |

FOREIGN PATENT DOCUMENTS

| EP | 1065535 | 1/2001 |
| TW | 00436667 | 5/2001 |

* cited by examiner

*Primary Examiner*—Frank G. Font
*Assistant Examiner*—Michael P. Mooney
(74) *Attorney, Agent, or Firm*—Rabin & Berdo, P.C.

(57) ABSTRACT

The present invention provides a two-beam interference exposure system that can be simply adjusted by rotating only one mirror. By placing a half-wave plate in one of the interference arms and precisely scanning the relative fiber position, the present invention can expose true apodized fiber Bragg gratings in a single scan by simultaneously rotating the angle of the half-wave plate. By rotationally switching the fast and slow axes of the half-wave plate, the present invention can also expose n-phase-shifted fiber grating by the same system.

12 Claims, 3 Drawing Sheets

FABRICATION OF TRUE APODIZED FIBER BRAGG GRATING USING A NEW TWO-BEAM INTERFEROMETER WITH POLARIZATION CONTROL

BACKGROUND OF THE INVENTION

1. Field of the Invention

The present invention generally relates to an exposure system and a method for fabricating a true apodized fiber Bragg grating and, more particularly, to an exposure system and a method for fabricating a true apodized fiber Bragg grating by using two-beam interferometer.

2. Description of the Prior Art

When fabricating a complex fiber Bragg structure, refractive-index modulation and phase control are the most concerned parameters. It is therefore important to uniform the dc refractive-index modulation in addition to phase control during the exposure scan.

The Taiwan Patent Publication No. 436,667 discloses a method for fabricating a low-noise fiber Bragg grating by using a phase mask and an aperture so as to achieve uniform dc refractive-index modulation. Firstly in the method, a UV light passes through the aperture and then the phase mask as to form a grating in a photosensitive fiber. Secondly, the phase mask is moved backwards for a certain distance so that a non-interfered area (in the included angle of the first order diffracted light) serves as compensation of the refractive index of the fiber Bragg grating. Similarly, the U.S. Pat. No. 5,830,622 discloses a two-step method for modulating the variation of the refractive index. Firstly in the method, a grating is formed in the fiber. Secondly, light with pre-determined intensity distribution is irradiated on the grating. The above-referenced method is simple but requires a two-step exposure process. Moreover, the relation between the variation of the refractive index of the fiber and the light intensity for exposure is non-linear, resulting in critical control in light intensity in the second step exposure. As a matter of fact, these two prior art patents disclose methods that can not be immune from non-uniform refractive index and therefore the undesired noise.

In the United States Patent Publication No. 20020015919, there is therefore provided a method overcoming the afore-mentioned problems. In the method, two light beams with perpendicular polarization directions of electric fields are provided. An interference fringe pattern is formed behind a phase mask after the light beams are incident on the phase mask by an incident angle. Accordingly, the interference fringe pattern is adjusted by tuning the included angle of the light beams as well as the distance between the fiber and the grating so as to achieve modulation of the refractive index. Even though this method overcomes the problems brought forth by the Taiwan Patent Publication No. 436,667 and the U.S. Pat. No. 5,830,622, the phase difference in the interference fringe is very sensitive to precise control in the included angle between the light beams and the distance between the fiber and the phase mask. Moreover, the U.S. Pat. No. 5,367,588 discloses a grating with uniform dc refractive-index modulation by using a specially designed phase mask. The phase mask has a period-variable grating as to compensate the variation of the refractive index of the fiber. Even though the phase mask is more convenient in use than the other prior art patents, it suffers from the high price. In addition, due to the lack of flexibility in designing the variation of the refractive index of the grating, different phase masks are required when various fiber gratings are to be exposed.

European Patent No. 1065535 discloses an apparatus including a light-enhancement screen mask in addition to a phase mask for exposure in the fiber. When both of the two screen masks are irradiated by the same light beam, the light intensity on different grating positions remains constant during the exposure scan. However, the application of this method is limited due to standard design of the light-enhancement screen mask, which lacks of changeability in modulation of refractive index.

Furthermore, a perturbation method can also be used. However, it requires an interferometer to precisely control the displacement of the fiber corresponding to the mask, which is very sensitive to the perturbation of the exposure system. On the other hand, when the conventional two-beam interferometer is used for exposure, the reflection mirrors corresponding to the two light beams are required to be precisely controlled to achieve precise exposure. However, it is difficult to do so.

Therefore, the present invention has been made to solve the afore-mentioned problems in view of the forgoing status and to further provide an exposure system and a method for fabricating a true apodized fiber Bragg grating by using two-beam interferometer.

SUMMARY OF THE INVENTION

It is the primary object of the present invention to provide an exposure system and a method for fabricating a true apodized fiber Bragg grating, characterized in that only a single continuous exposure step is required to fulfill the variation of refractive index of any fiber Bragg grating, which effectively reduces the time, cost and difficulty in fabrication.

It is another object of the present invention to provide an exposure system for a true apodized fiber Bragg grating, characterized in that only a refection mirror is required to be adjusted.

In one aspect of the present invention, an exposure system for a photosensitive fiber is provided as to form a grating in the photosensitive fiber. The exposure system comprises: a light source; a rotating reflection mirror; a beam splitter; a first fixed reflection mirror; a second fixed reflection mirror; and a half-wave plate module. The light source generates a light beam. The rotating reflection mirror rotates around a pre-determined position as to enable the light beam to be reflected into a first direction after irradiating the rotating reflection mirror.

The beam splitter splits the incident light beam with a pre-determined incident angle into a first split light beam and a second split light beam. The first fixed reflection mirror is fixed on a first pre-determined position so that the first split light beam is reflected into a second direction after it is irradiated on the first fixed reflection mirror. The second fixed reflection mirror is fixed on a second pre-determined position so that the second split light beam is reflected into a third direction after it is irradiated on the second fixed reflection mirror. The half-wave plate module is installed facing the third direction as to convert the second split light beam into a light beam with pre-determined polarization. The present invention is not thus limited. It is possible that the half-wave plate module is installed facing the second direction as to convert the first split light beam into the light beam with pre-determined polarization.

As the incident light beam have experienced the light path, an interference fringe appears where the first split light beam and the light beam with pre-determined polarization intersect, such that the grating is formed in the photosensitive fiber according to the interference fringe.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE INVENTION

The present invention providing an exposure system and a method for fabricating a true apodized fiber Bragg grating can be exemplified by the preferred embodiments as described hereinafter.

Figure 1:
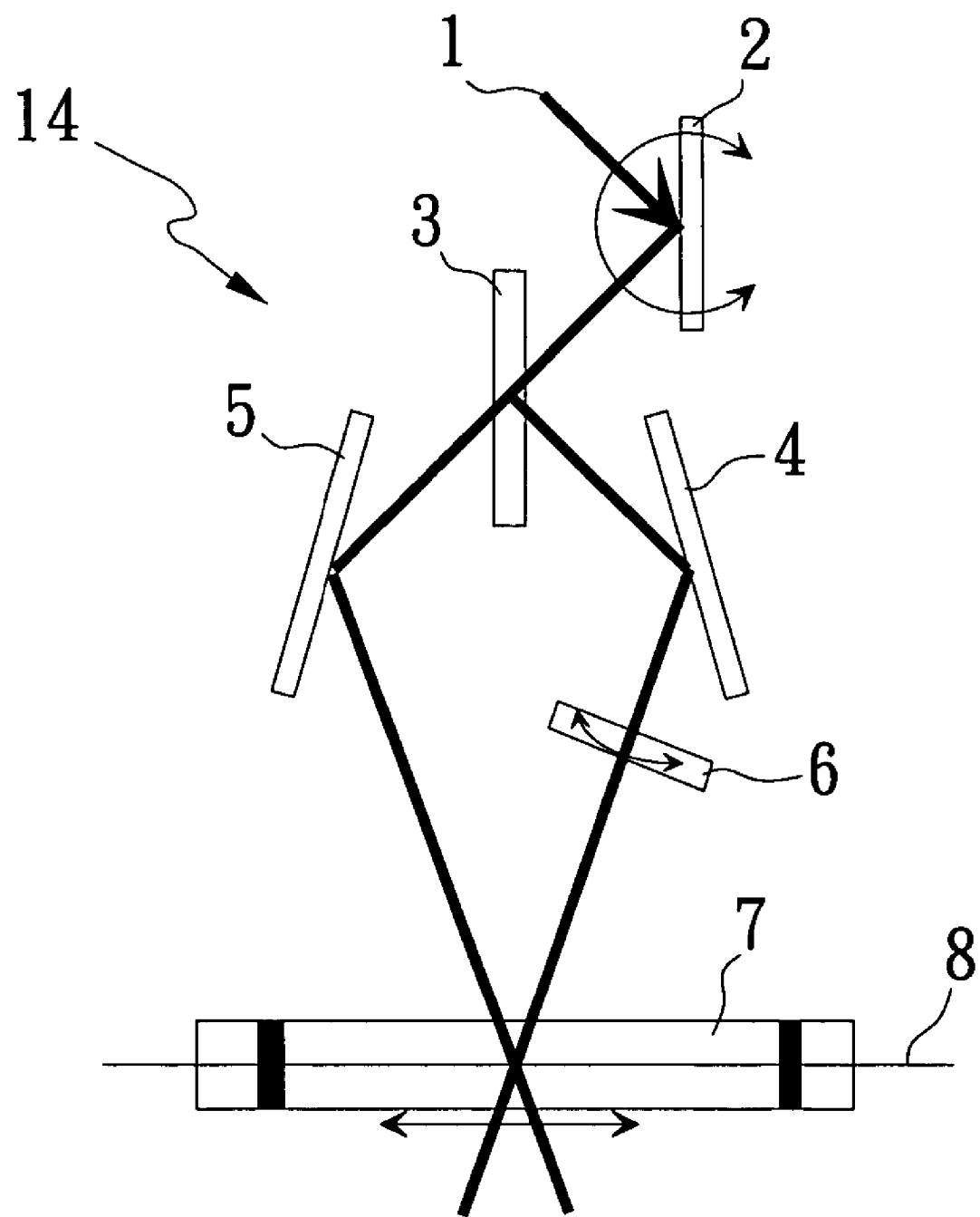
FIG. 1 is a schematic diagram showing an exposure system 14 for the fiber grating in accordance with the present invention.

To start with, please refer to FIG. 1, which is a schematic diagram showing an exposure system 14 for the fiber grating in accordance with the present invention. The preferred embodiment of the present invention is shown as an exposure system 14 for forming a grating in a photosensitive fiber. The exposure system 14 comprises: a light source 1; a rotating reflection mirror 2; a beam splitter 3; a first fixed reflection mirror 4; a second fixed reflection mirror 5; a half-wave plate module 6; and a movable base 7.

The light source 1 generates a single-polarization light beam. In one embodiment of the present invention, the light source 1 is a UV light source for generating a UV light beam. The UV light beam passes through the rotating reflection mirror 2. Since the rotating reflection mirror 2 has been tuned, it is able to reflect the UV light beam into a first direction. According to the present invention, the rotating reflection mirror 2 includes a refection mirror and a rotating base. The refection mirror is installed on the rotating base such that the reflection mirror rotates around a pre-determined position as to enable the UV light beam to be reflected into the first direction after irradiating the reflection mirror.

The beam splitter 3 splits the UV light beam in the first direction with a pre-determined incident angle into a first split light beam and a second split light beam, which share the same light intensity. As shown in FIG. 1, the first split light beam travels to the bottom left, and is incident on a pre-determined position on the photosensitive fiber 8 on the bottom right after being reflected by the reflection mirror 5. On the other hand, the second split light beam travels to the bottom right, and is incident on the same pre-determined position on the photosensitive fiber 8 after being reflected by the reflection mirror 4 and passing through the half-wave plate module 6.

In the preferred embodiment, the half-wave plate module 6 includes a half-wave plate and a rotating base. The rotating base carries the half-wave plate such that the half-wave plate rotates around a pre-determined position as to enable the reflected second split light beam to pass through the half-wave plate and be polarized with a pre-determined polarization direction.

Figure 2:
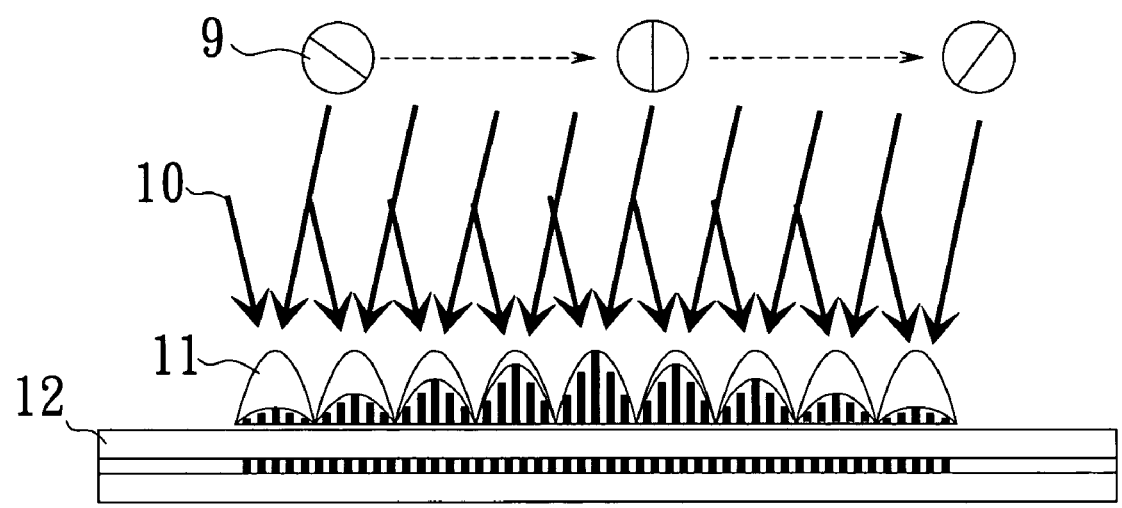
FIG. 2 is a schematic diagram showing the exposure process of the exposure system in FIG. 1.

Please further refer to FIG. 2, which is a schematic diagram showing the exposure process of the exposure system in FIG. 1. The photosensitive fiber 8 can be exposed by interference of two light beams incident on the same pre-determined position. In the preferred embodiment of the present invention, the photosensitive fiber 8 is disposed on a movable base 7. The movable base 7 has nanometer-scale resolution such that the photosensitive fiber 8 on the movable base 7 moves in nanometer-scale, resulting in continuous exposure on the photosensitive fiber and thus complicated structure of fiber Bragg grating.

Accordingly, the present invention can be embodied by adding a rotating reflection mirror and a half-wave plate module to a conventional two-beam interference exposure system. The present invention is thus useful.

Please refer to FIG. 1 as reference to a method for fabricating a true apodized fiber Bragg grating by using two-beam interferometer:

Step 1: providing a photosensitive fiber on a continuously movable base, wherein the displacement of the movable base is measured by a He—Ne laser interferometer;

Step 2: adding a rotating reflection with fine-tuning to the two-beam interference exposure system and adding a half-wave plate module with fine-tuning to one optical path of the two beams;

Step 3: installing the photosensitive fiber on the movable base in an area perpendicular to the interference fringe; and Step 4: passing a UV light beam through the two-beam interference exposure system and forming a fiber Bragg grating by exposure on the fiber; gradually moving the photosensitive fiber and tuning the angle of the half-wave plate as to determine the contrast of interference fringe; increasing the light intensity and achieving apodization exposure as to keep the dc refractive-index modulation as a constant; and obtaining a low-noise fiber Bragg grating.

Figure 3:
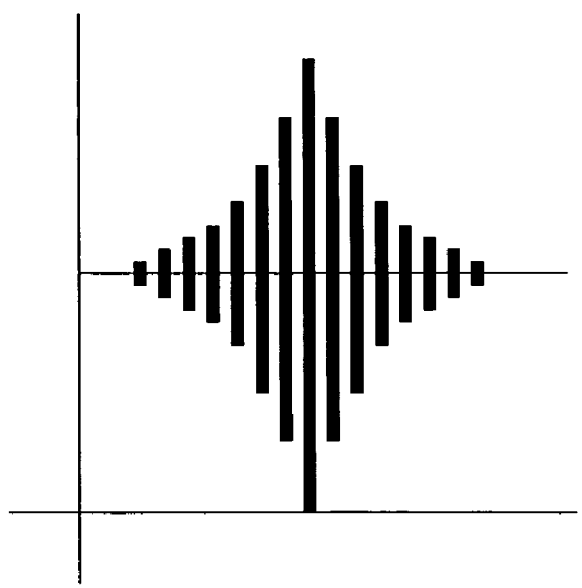
FIG. 3 is a graph showing the refractive-index modulation in accordance with the present invention.

Experimental results are also provided as to assert the enablement of the present invention. Please refer to FIG. 3, which is a graph showing the refractive-index modulation in accordance with the present invention. In FIG. 3, the distribution of dc refractive-index modulation is uniform. In other words, the present invention achieves a true apodized fiber Bragg grating.

Figure 4:
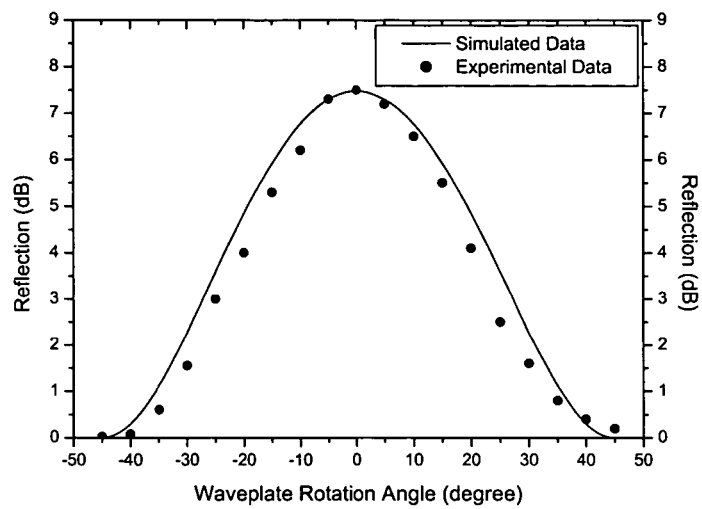
FIG. 4 is a graph showing the experimental data and simulated data of the contrast of interference fringe according to the exposure system in FIG. 1.

Please refer to FIG. 4, which is a graph showing the experimental data and simulated data of the contrast of interference fringe according to the exposure system in FIG. 1. As previously mentioned, the contrast of interference fringe depends on the positioning of the half-wave plate.

Figure 5:
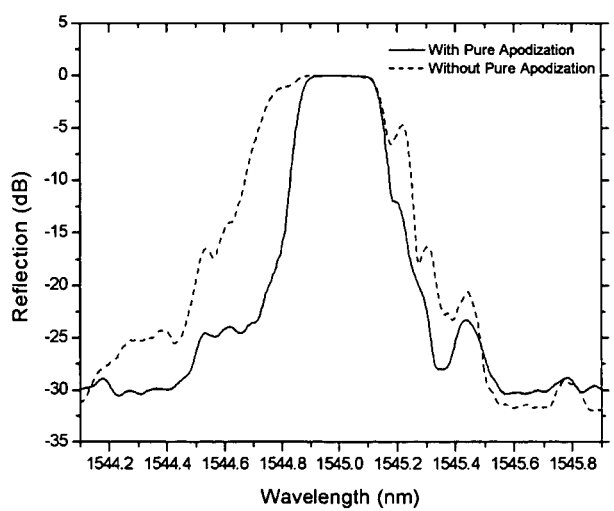
FIG. 5 is a graph showing the reflection spectrum of the fiber Bragg grating in accordance with the present invention.

Please further refer to FIG. 5, which is a graph showing the reflection spectrum of the fiber Bragg grating in accordance with the present invention. In FIG. 5, the dotted line represents the reflection spectrum of the fiber Bragg grating without pure apodization, while the solid line represents the reflection spectrum of the fiber Bragg grating with pure apodization.

In summary, the present invention has advantages over the prior art patents:

1. Only a single continuous exposure step is required to fulfill true apodized fiber Bragg gratings, which increases the precision of refractive-index modulation.

2. Polarization control is used to modulate the refractive index, which is more reliable and less costly than the conventional arts.

3. The present invention can be applied in the conventional two-beam interference exposure systems, thus enhancing the utility.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. An exposure system for forming a grating on a photosensitive fiber, the exposure system comprising:
    a light source, for generating a light beam;
    a rotating reflection mirror, for rotating around a pre-determined position as to enable the light beam to be reflected into a first direction after irradiating the rotating reflection mirror;
    a beam splitter, for splitting the light beam with a pre-determined incident angle into a first split light beam and a second split light beam, both of which share the same intensity;
    a first fixed reflection mirror, fixed on a first pre-determined position so that the first split light beam is reflected into a second direction after it is irradiated on the first fixed reflection mirror;
    a second fixed reflection mirror, fixed on a second pre-determined position so that the second split light beam is reflected into a third direction after it is irradiated on the second fixed reflection mirror; and
    a half-wave plate module, installed facing the third direction as to convert the second split light beam into a light beam with pre-determined polarization;
    wherein an interference fringe appears where the first split light beam and the light beam with pre-determined polarization intersect such that the grating is formed in the photosensitive fiber according to the interference fringe.

2. The exposure system as recited in claim 1, wherein the half-wave plate module comprises a half-wave plate as to enable the reflected second split light beam to be polarized with a pre-determined polarization direction.

3. The exposure system as recited in claim 2, wherein the half-wave plate module further comprises a rotating base as to carry the half-wave plate such that the half-wave plate rotates around a pre-determined position as to enable the reflected second split light beam to pass through the half-wave plate and be polarized with the pre-determined polarization direction.

4. The exposure system as recited in claim 1, wherein the photosensitive fiber is disposed on a movable base such that the photosensitive fiber is continuously exposed.

5. The exposure system as recited in claim 1, wherein the rotating reflection mirror includes a refection mirror and a rotating base, the refection mirror installed on the rotating base such that the reflection mirror rotates around a pre-determined position as to enable the light beam to be reflected into the first direction after irradiating the reflection mirror.

6. The exposure system as recited in claim 1, wherein the light source is a UV light source and the light beam is a UV light beam.

7. An exposure method for forming a grating on a photosensitive fiber, the exposure method comprising steps of:
    providing a light source, for generating a light beam;
    providing a rotating reflection mirror, for rotating around a pre-determined position as to enable the light beam to be reflected into a first direction after irradiating the rotating reflection mirror;
    providing a beam splitter, for splitting the light beam with a pre-determined incident angle into a first split light beam and a second split light beam, both of which share the same intensity;
    providing a first fixed reflection mirror, fixed on a first pre-determined position so that the first split light beam is reflected into a second direction after it is irradiated on the first fixed reflection mirror;
    providing a second fixed reflection mirror, fixed on a second pre-determined position so that the second split light beam is reflected into a third direction after it is irradiated on the second fixed reflection mirror; and
    providing a half-wave plate module, installed facing the third direction as to convert the second split light beam into a light beam with pre-determined polarization;
    wherein an interference fringe appears where the first split light beam and the light beam with pre-determined polarization intersect such that the grating is formed in the photosensitive fiber according to the interference fringe.

8. The exposure method as recited in claim 7, wherein the half-wave plate module comprises a half-wave plate as to enable the reflected second split light beam to be polarized with a pre-determined polarization direction.

9. The exposure method as recited in claim 8, wherein the half-wave plate module further comprises a rotating base as to carry the half-wave plate such that the half-wave plate rotates around a pre-determined position as to enable the reflected second split light beam to pass through the half-wave plate and be polarized with the pre-determined polarization direction.

10. The exposure method as recited in claim 7, wherein the photosensitive fiber is disposed on a movable base such that the photosensitive fiber is continuously exposed.

11. The exposure method as recited in claim 7, wherein the rotating reflection mirror includes a refection mirror and a rotating base, the refection mirror installed on the rotating base such that the reflection mirror rotates around a pre-determined position as to enable the light beam to be reflected into the first direction after irradiating the reflection mirror.

12. The exposure method as recited in claim 7, wherein the light source is a UV light source and the light beam is a UV light beam.

* * * * *